United States Patent
Kirkpatrick

(10) Patent No.: US 12,305,725 B2
(45) Date of Patent: May 20, 2025

(54) ALL-CMC BRAKE WITH WEAR DEBRIS DELIVERY SYSTEM

(71) Applicant: GOODRICH CORPORATION, Charlotte, NC (US)

(72) Inventor: Christopher T. Kirkpatrick, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 524 days.

(21) Appl. No.: 17/718,889

(22) Filed: Apr. 12, 2022

(65) Prior Publication Data

US 2023/0323925 A1 Oct. 12, 2023

(51) Int. Cl.
*F16D 65/00* (2006.01)
*F16D 55/22* (2006.01)
*F16D 65/12* (2006.01)

(52) U.S. Cl.
CPC ......... *F16D 65/0037* (2013.01); *F16D 55/22* (2013.01); *F16D 65/125* (2013.01); *F16D 2200/0047* (2013.01)

(58) Field of Classification Search
CPC .... F16D 65/0037; F16D 55/22; F16D 65/125; F16D 2200/0047
USPC .................................................. 188/218 XL
See application file for complete search history.

(56) References Cited

U.S. PATENT DOCUMENTS

| 3,731,776 A | 5/1973 | Fisher |
| 2020/0189729 A1* | 6/2020 | Heid ........................ F16D 55/36 |
| 2021/0107441 A1* | 4/2021 | Georgin ................ B60T 17/221 |
| 2021/0156440 A1* | 5/2021 | Pajak ...................... B64C 25/42 |
| 2021/0239173 A1 | 8/2021 | Kirkbride |

FOREIGN PATENT DOCUMENTS

| CN | 112128274 | 12/2020 |
| EP | 3667114 | 6/2020 |
| EP | 3862589 | 8/2021 |
| GB | 794926 | 5/1958 |
| JP | 7012154 A | 1/1995 |

OTHER PUBLICATIONS

European Patent Office, European Search Report dated Aug. 14, 2023 in Application No. 23163284.5.

* cited by examiner

*Primary Examiner* — Christopher P Schwartz
(74) *Attorney, Agent, or Firm* — SNELL & WILMER L.L.P.

(57) ABSTRACT

A wear debris delivery system includes a brake component fabricated from a ceramic matrix composite (CMC). The brake component includes a stator disk, the stator disk having at least one wear surface, and a torque plate barrel having a series of axially extending stator splines, wherein the stator splines are configured to support the stator disk. The wear debris delivery system includes an injector configured to inject wear debris into the brake component such that the wear debris travels through the torque plate barrel to the stator disk via the stator splines.

20 Claims, 4 Drawing Sheets

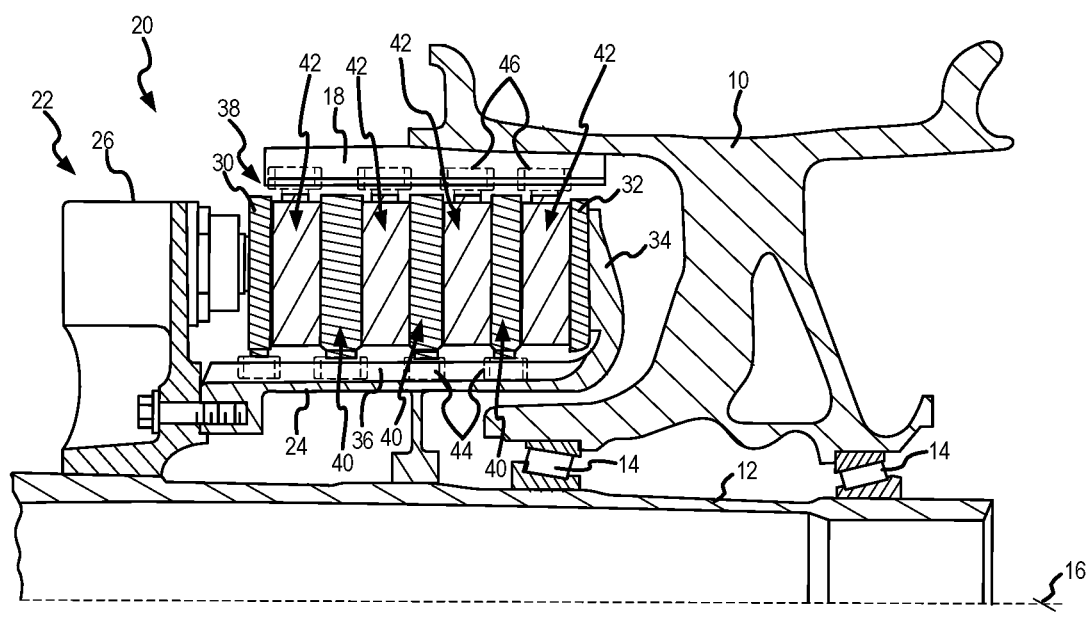
FIG. 1
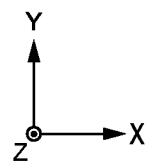

ALL-CMC BRAKE WITH WEAR DEBRIS DELIVERY SYSTEM

FIELD

The present disclosure relates to aircraft wheel and brake systems and, more particularly, composites having an injected wear debris and methods of using the same.

BACKGROUND

Aircrafts typically utilize brake systems or mechanisms on wheels to slow or stop the aircraft during landings, taxiing and emergency situations, such as, for example, a rejected takeoff (RTO), which generally refers to application of a brake mechanism during an aborted takeoff and involves high braking loads over a short time period, resulting in a rapid increase in the brake temperature. A brake mechanism generally employs a heat sink comprising a series of friction disks, sandwiched between a pressure plate and an end plate, that may be forced into sliding contact with one another during a brake application to slow or stop the aircraft. Under various conditions, such brake applications may generate high temperatures and frictional loads throughout the heat sink and particularly on the surfaces of the stators and rotors and the pressure plate and the end plate that comprise the heat sink. Heat sinks may exhibit static and dynamic frictional performance that vary greatly in response to environmental conditions (e.g., ambient temperature or humidity) and to the type of braking operation being performed (e.g., short runway take-off, landing or rejected take off).

Next generation heat sinks are expected to exhibit greater heat capacities in order to absorb and dissipate greater amounts of heat. However, implementing a ceramic matrix composite (CMC) brake that has appropriate strength and the appropriate specific heat (Cp) has proven difficult. For instance, with carbon fiber-reinforced/carbon matrix (C/C) brakes, the brakes tend to wear more at cooler temperatures. During cold taxis, the friction coefficient is high during braking and large particles are generated which have minimal adherence to the wear surface. Thus approximately 70% of wear happens during this time. Additionally, CMC brakes can be "grabby" and cause excess vibration in the system.

SUMMARY

The disclosure provides a wear debris delivery system. The wear debris delivery system includes a brake component fabricated from a ceramic matrix composite (CMC). The brake component includes a stator disk, the stator disk having at least one wear surface, and a torque plate barrel having a series of axially extending stator splines, wherein the stator splines are configured to support the stator disk. The wear debris delivery system includes an injector configured to inject wear debris into the brake component such that the wear debris travels through the torque plate barrel to the stator disk via the stator splines.

In various embodiments, the CMC structure includes at least one of a silicon-carbide fiber/silicon-carbide matrix, a carbon fiber/carbon matrix or a carbon fiber/silicon-carbide matrix, an alumina matrix, a mullite matrix or a zirconium diboride matrix.

In various embodiments, the CMC structure includes one or more compositions, including: borides, carbides, oxides, phosphides, nitrides or mixed phases, including oxynitrides, or oxycarbides; carbon or silicon-based compositions; refractory metal carbides; or silica and phosphate-based glasses or glass ceramics.

In various embodiments, the wear debris includes at least one of a hexagonal boron nitride, graphite or pitch-based Carbon power.

In various embodiments, the torque plate barrel is configured to receive the wear debris via a tube disposed along the torque plate barrel.

In various embodiments, the tube is fluidly coupled to the stator splines.

In various embodiments, the stator splines include at least one hole such that the stator splines are configured to carry the wear debris through the wear debris delivery system and deliver the wear debris to the stator disk.

In various embodiments, the brake component further comprises a rotor disk.

In various embodiments, the injector creates a high pressure spray between the rotor disk and the stator disk.

In various embodiments, the wear debris delivery system further includes two or more injectors.

In various embodiments, a method of operating a wear debris delivery system includes initiating a braking event of a brake component fabricated from a ceramic matrix composite (CMC). The brake component includes a stator disk, the stator disk having at least one wear surface, and a torque plate barrel having a series of axially extending stator splines, wherein the stator splines are configured to support the stator disk. The method further includes initiating an injection of a wear debris via an injector configured to inject wear debris into the brake component such that the wear debris travels through the torque plate barrel to the stator disk via the stator splines, and continuously metering the wear debris injection into the braking component.

In various embodiments, the CMC structure includes at least one of a silicon-carbide fiber/silicon-carbide matrix, a carbon fiber/carbon matrix or a carbon fiber/silicon-carbide matrix, an alumina matrix, a mullite matrix or a zirconium diboride matrix.

In various embodiments, the CMC structure includes one or more compositions, including: borides, carbides, oxides, phosphides, nitrides or mixed phases, including oxynitrides, or oxycarbides; carbon or silicon-based compositions; refractory metal carbides; or silica and phosphate-based glasses or glass ceramics.

In various embodiments, the wear debris includes at least one of a hexagonal boron nitride, graphite, or pitch-based Carbon power.

In various embodiments, the torque plate barrel is configured to receive the wear debris via a tube disposed along the torque plate barrel.

In various embodiments, the tube is fluidly coupled to the stator splines.

In various embodiments, the stator splines include at least one hole such that the stator splines are configured to carry the wear debris through the wear debris delivery system and deliver the wear debris to the stator disk.

In various embodiments, the brake component further comprises a rotor disk.

In various embodiments, the injector creates a high pressure spray between the rotor disk and the stator disk.

In various embodiments, the method further includes initiating an injection of a wear debris via two or more injectors.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

FIG. 1 illustrates a multi-disk brake assembly, in accordance with various embodiments;

Figure 2:
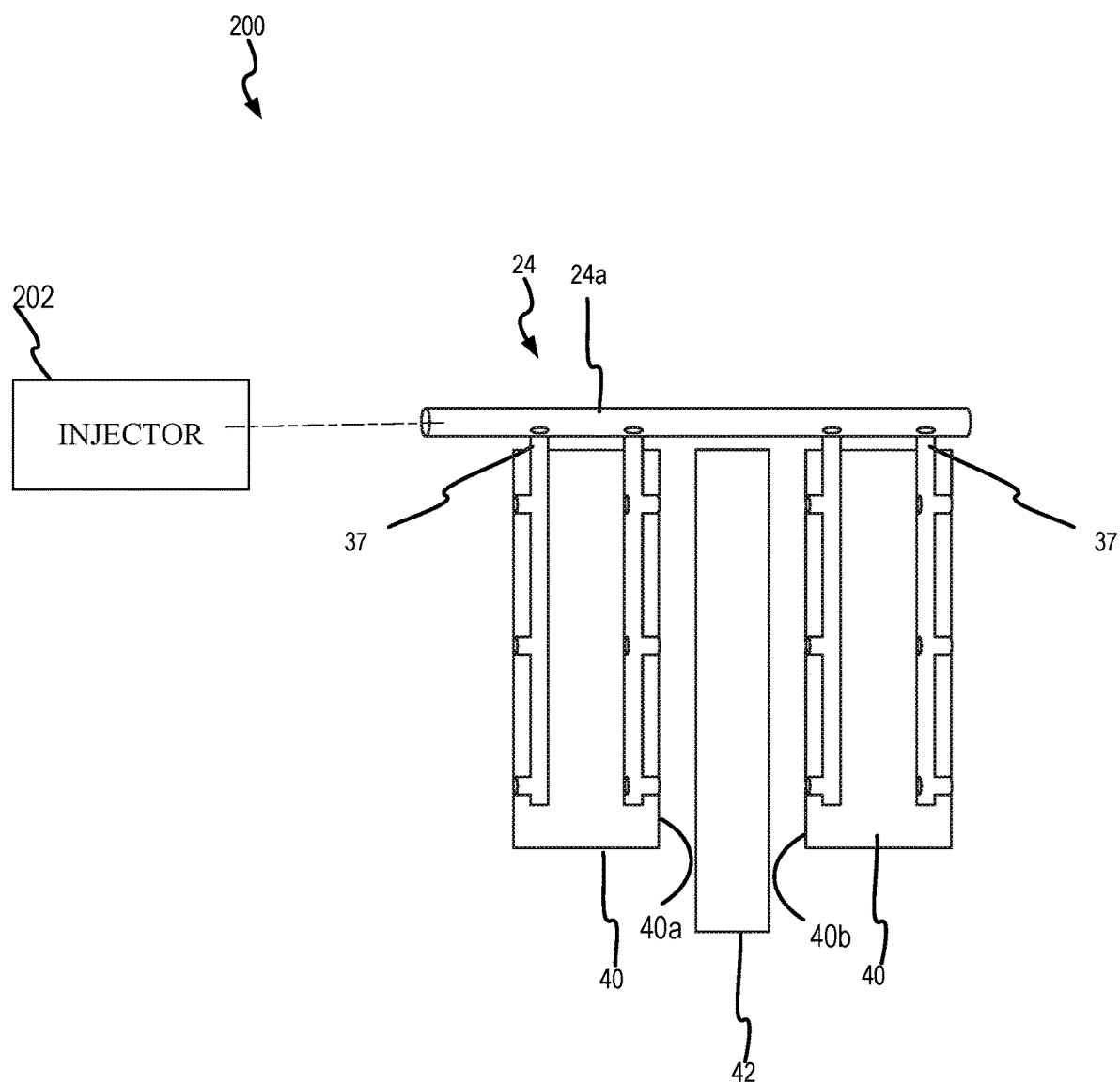
FIG. 2 illustrates a wear debris delivery system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure as defined by the claims. Thus, the detailed description herein is presented for purposes of elucidation and not of limitation. Furthermore, any reference to the singular includes plural embodiments, and any reference to more than one component or step may include a singular embodiment or step. Likewise, references to "a," "an" or "the" may include one item or more than one item and such reference to an item in the singular may also include the item in the plural. Also, any reference to attached, fixed, connected, or the like may include permanent, removable, temporary, partial, full or any other possible attachment option. Additionally, any reference to without contact (or similar phrases) may also include reduced contact or minimal contact. As used herein, "distal" refers to a direction outward, or generally away, from a reference component and "proximal" or "proximate" refer to a direction inward, or generally, towards the reference component. All ranges may include upper and lower values and all ranges and ratio limits disclosed herein may be combined. Further, the term "about" is intended to include a degree of error associated with measurement of a particular quantity based upon equipment or techniques otherwise available at the time of filing the application. For example, "about" may include a range of ±5% or 2% of a given value.

Provided herein, according to various embodiments, is a wear debris delivery system that may act in response to initiation of a braking event of a brake component including ceramic matrix composite (CMC) heat sink components. While numerous details are included herein pertaining to aircraft components, such as brake components, the components and method(s) disclosed herein can be applied to other carbon fiber-reinforced/carbon matrix (C/C) composite components that benefit from better wear performance.

With reference to FIG. 1, a multi-disk brake assembly 20 is illustrated, in accordance with various embodiments. Brake assembly 20 is mounted on an axle 12 for use with a wheel 10 disposed on and configured to rotate about the axle 12 via one or more bearing assemblies 14. A central axis 16 extends through the axle 12 and defines a center of rotation of the wheel 10. A torque plate barrel 24 (sometimes referred to as a torque tube or barrel or a torque plate) is aligned concentrically with the central axis 16. Wheel 10 is rotatable relative to the torque plate barrel 24. Torque plate barrel 24 includes a series of axially extending stator splines 36 (one shown). Wheel 10 includes a series of axially extending rotor splines 18 (one shown). Rotation of wheel 10 is modulated by brake assembly 20.

Brake assembly 20 includes a plurality of brake disks 38. The plurality of brake disks 38 includes at least one non-rotatable friction disk (stator disk) 40, and at least one rotatable friction disk (rotor disk) 42. Each of the brake disks 38 includes an attachment structure. In various embodiments, each of the stator disks 40 includes a plurality of stator lugs 44 at circumferentially spaced positions around an inner circumference of stator disks 40 as an attachment structure. Similarly, each of the rotatable rotor disks 42 includes a plurality of rotor lugs 46 at circumferentially spaced positions around an outer circumference of rotor disks 42.

Brake disks 38 may include an end plate 32 and a pressure plate 30 located on opposing axial ends of the brake disk stack. End plate 32 is connected to, or is otherwise frictionally engaged with, a reaction plate 34 of torque plate barrel 24. End plate 32 is non-rotatable by virtue of its connection to torque plate barrel 24. Stator splines 36 may support pressure plate 30 such that pressure plate 30 is also non-rotatable. Stator splines 36 may also support non-rotatable stator disks 40. Stator disks 40 may engage stator splines 36 with gaps formed between stator lugs 44. Similarly, rotor disks 42 may engage rotor splines 18 with gaps formed between rotor lugs 46. Rotor disks 42 may be rotatable by virtue of their engagement with rotor splines 18 of wheel 10.

An actuating mechanism for the brake assembly 20 includes a plurality of piston assemblies 22 (one shown) circumferentially spaced around a piston housing 26. Upon actuation, the plurality of piston assemblies affects a braking action by urging the pressure plate 30 and the plurality of stator disks 40 into frictional engagement with the plurality of rotor disks 42 and against the end plate 32. Through compression of the plurality of rotor disks 42 and the plurality of stator disks 40 between the pressure plate 30 and the end plate 32, the resulting frictional contact slows or stops or otherwise prevents rotation of the wheel 10.

In various embodiments, the plurality of rotor disks 42 and the plurality of stator disks 40 are fabricated from various materials, such as, for example, carbon-carbon(C—C) material or ceramic matrix composite (CMC) materials, that enable the brake disks to withstand and dissipate the heat generated during and following a braking action. The plurality of rotor disks 42 and the plurality of stator disks 40 may be C—C, CMC, or a combination of C—C and CMC (e.g., the plurality of rotor disks 42 are C—C and the plurality of stator disks 40 are CMC.

In various embodiments, the non-rotating frictional components of brake assembly 20 (i.e., pressure plate 30, end plate 32, and stator disks 40) may comprise a material that is different from the material of the rotating frictional component (e.g., rotor disks 42). For example, in various embodiments, rotor disks 42 comprise a carbon fiber-carbon matrix (C/C) composite material and pressure plate 30, end plate 32, and/or stator disks 40 comprise CMC material. In various embodiments, in the unworn state (i.e., prior to use) the axial thickness of the rotor disks 42 and/or of the stator disks 40 in brake assembly 20 may vary.

One or more of the brake or heat sink components described above (e.g., one or more of the plurality of stator disks 40 or the plurality of rotor disks 42) may be fabricated from a ceramic matrix composite (CMC) structure such as, for example, a silicon-carbide fiber/silicon-carbide matrix, a carbon fiber/carbon matrix, or a carbon fiber/silicon-carbide matrix. In various embodiments, the CMC structure may include one or more of, without limitation, alumina (e.g., an alumina matrix), boron carbide ($B_4C$), silicon carbide (SiC), mullite (e.g., a mullite matrix), or zirconium diboride (e.g., a zirconium diboride matrix). In various embodiments, the CMC structure may comprise one or more of borides, carbides, oxides, phosphides, nitrides or mixed phases including oxynitrides, oxycarbides and the like; carbon or silicon-based compositions; refractory metal carbides; silica and phosphate-based glasses or glass ceramics; and oxides, including, for example, aluminum oxide, zirconium oxide or zirconium dioxide, hafnium oxide, rare earth oxides, or combinations thereof. In various embodiments the borides may be selected among a group comprising: $ZrB_2$, $HfB_2$, $VB_2$, $TiB_2$, $TaB_2$, $TaB$, $NbB_2$, $NbB$, $CrB_2$, $Mo_2B_5$, $W_2B_5$, $Fe_2B$, $FeB$, $Ni_2B$, $NiB$, $LaB_6$, $CoB$, $Co_2B$, or any other refractory boride. In various embodiments, the carbides may be selected among a group comprising: SiC, HfC, ZrC, C, $B_4C$, SiOC, SiBCN, TiC, WC, $Mo_2C$, TaC, NbC, or any other refractory carbide. In various embodiments, the oxides may be selected among a group comprising: $HfO_2$, $ZrO_2$, $Al_2O_3$, $SiO_2$, class compositions including aluminosilicates, borosilicates, lithium aluminosilicates (LAS), magnesium aluminosilicates, barium magnesium aluminosilicates (BMAS), calcium aluminosilicates or other silica containing high temperature glasses, or other mixed metal oxides. In various embodiments, the nitrides may be selected among a group comprising: AlN, $Si_3N_4$, SiAlON, TaN, TiN, TiAlN, $W_2N$, WN, $WN_2$, VN, ZrN, BN, HfN, NbN, or any other refractory nitrides. In various embodiments, the CMC structure may comprise mixed refractory nonoxides such as, for example, SiCN.

Advantageously, when using a CMC material, the total heat capacity (e.g., the material specific heat, $c_p$, multiplied by the material mass, M) of the resulting component is increased beyond that of the heat capacity of a C/C material. In various embodiments, a higher heat capacity of the brake component provides a greater ability to absorb and store the heat energy generated at the wear surfaces of the component without the attendant increase in temperature that accompanies materials having lower heat capacities. The ability to absorb and store greater amounts of heat energy at lower temperatures enables the brake component to absorb higher energies for longer periods of time, without increasing the brake temperature and the corresponding rate of oxidation of the brake component, than is possible for core materials having lower heat capacities.

Accordingly, a lighter and/or smaller brake may be used, while still achieving a total heat capacity that is commercially viable. The wheel structure that provides an enclosure for the brake may be reduced in size since the CMC brake may result in a same mass in smaller volume (e.g., package size). With the wheel structure (and/or heat-sink stack) being reduced in overall volume (i.e., package size, the weight of the wheels is also beneficially lowered. Similarly, the weight of the brake disks may also be reduced as a result of a reduction in wear surface thickness since less wear will occur between overhaul cycles.

Referring now to FIG. 2, a wear debris delivery system 200 ("delivery system") is illustrated. The delivery system 200 is configured to introduce a wear debris to wear surfaces of the stator disks 40. For instance, the wear debris may be a powder, liquid or solid injected onto a first wear surface 40a and a second wear surface 40b to provide a film to lubricate the wear surfaces of the CMC heat sink components, in particular the stator disks 40 and the rotor disks 42. Thus, the CMC brake disks wear is reduced.

The wear debris delivery system 200 may include an injector 202. The injector 202 is configured to inject (e.g., introduce, supply, pump, etc.) the wear debris through the wear debris delivery system 200 to lubricate the CMC disks. For instance, the CMC disks are the one or more of the brake or heat sink components described above (e.g., one or more of the plurality of stator disks 40 or the plurality of rotor disks 42) fabricated from the ceramic matrix composite (CMC) structure. The injector 202 may be fluidly coupled to the torque plate barrel 24. For instance, the torque plate barrel 24 may be configured to receive the wear debris via a tube 24a disposed along the torque plate barrel 24. The tube 24a may be fluidly coupled to the stator splines 36. As described herein, the stator splines 36 may support non-rotatable stator disks 40. Stator disks 40 may engage stator splines 36 with gaps formed between the stator lugs 44. The tube 24a may be configured to fluidly couple to the stator disk 40 via the gaps formed between the stator lugs 44. Thus, the gaps of the stator splines 36 feed the wear debris into the stator disk via a tube 37, for instance, located at a gap between the stator lugs 44. Accordingly, the injector 202 may inject a wear debris such that the torque plate barrel 24 carries the wear debris to the stator splines 36. The stator splines 36 may include holes (e.g., passageways) to carry the wear debris through the wear debris delivery system 200 and deliver the wear debris to the stator disks 40. For instance, the stator splines 36 may comprise holes to allow the wear debris to disperse across the first and second wear surfaces 40a, 40b.

Figure 3A:
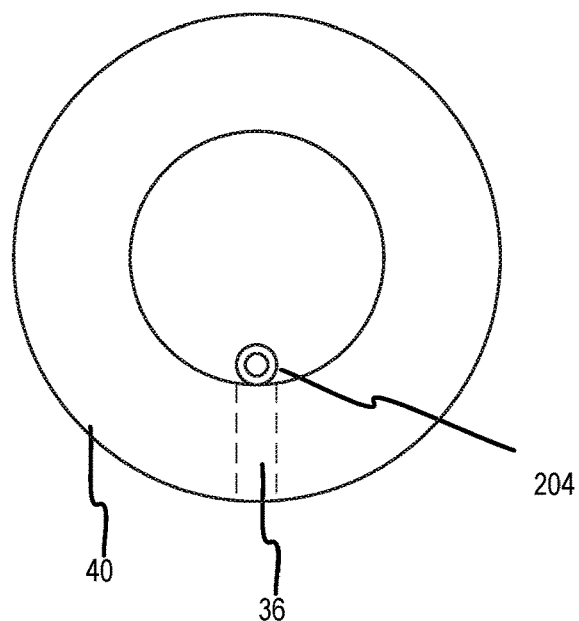
FIG. 3A illustrates a wear debris delivery system, in accordance with various embodiments.
Figure 3B:
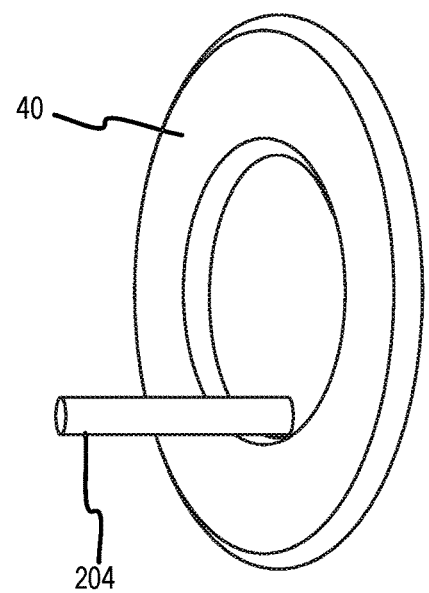
FIG. 3B illustrates a wear debris delivery system, in accordance with various embodiments.

In various embodiments, the wear debris can be introduced through a tube 204 positioned at the stator disk 40 inner diameter (see FIGS. 3A-3B). The tube 204 is configured to deliver the wear debris to the wear surfaces of the stator disk 40. In various embodiments, the wear debris may be pumped to the inner diameter of the heatsink and allowed to diffuse between the wear surfaces. In various embodiments, the wear debris may be delivered via a high-pressure spray between the rotor disks 42 and the stator disks 40. In various embodiments, the wear debris may be pneumatically sprayed (e.g., when the wear debris is in powder form). In various embodiments, there may be a plurality of injectors.

Suitable wear debris powders (e.g., lubricants) may include, for example, hexagonal boron nitride (h-BN), graphite, and pitch-based Carbon power. Additional wear debris powders may include silicon carbide (SiC), boron (B), boron carbide ($B_4C$), silicon nitride ($Si_3N_4$), or other similar oxides, borides or nitrides. A range of particle sizes (or powder sizes) may be employed. For example, in various embodiments, a micron-sized boron powder or micron-sized boron carbide powder may be selected. In various embodiments, the powder size may include a particle size distribution such as a bimodal particle distribution. In various embodiments, the powder size (or the powder size distribution) may be selected based on a desired grain size with smaller powder sizes yielding smaller grain sizes. For example, a nanoparticle-sized powder is typically found to yield a smaller grain size than a micrometer-sized powder. The grain size may also impact the thermal properties of the finished component. In various embodiments, uniformity of the dimensions or size of individual particles of the powder (e.g., a particle uniformity) may vary. For example, the particle uniformity may vary in characteristic dimension (e.g., diameter) by as much as +/−80%. In various embodiments, the particle size or uniformity may also vary according to a Gaussian distribution or by other industrially accepted variances.

Figure 4:
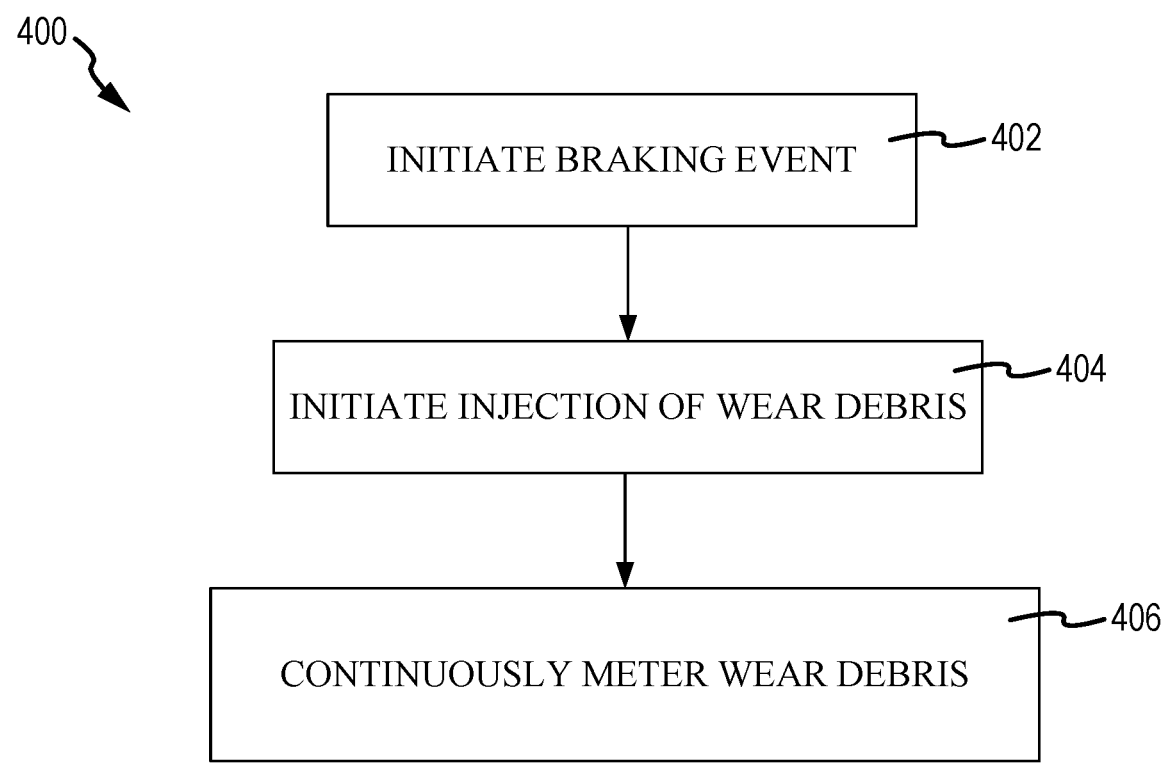
FIG. 4 illustrates a method of operating a wear debris delivery, in accordance with various embodiments.

Referring now to FIG. 4, a method 400 of operating a wear debris delivery system 200 is described. At 402, brake assembly 20 initiates a braking event. At 404, the injector 202 initiates the injection of the wear debris into the wear debris delivery system 200 to lubricate the brake. For instance, the injector 202 may be fluidly coupled to the torque plate barrel 24. The torque plate barrel 24 may be configured to receive the wear debris via a tube 24a disposed along the torque plate barrel 24. The tube 24a may be fluidly coupled to the stator splines 36. Accordingly, the injector 202 injects a wear debris such that the torque plate barrel 24 carries the wear debris to the stator splines 36 and delivers the wear debris to the stator disks 40. At 406, the wear debris delivery system 200 continuously feeds the lubricant to the wear surface. In other words, the injector meters the wear debris such that the wear debris is constantly injected in small amounts to reduce the wear on the brakes.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

What is claimed is:

1. A wear debris delivery system comprising:
   a brake component comprising:
      a stator disk, the stator disk having at least one wear surface; and
      a torque plate barrel having a series of axially extending stator splines, wherein the stator splines are configured to support the stator disk;
   an injector configured to inject wear debris into the brake component such that the wear debris travels through the torque plate barrel to the stator disk via the stator splines, wherein the stator splines include at least one hole such that the stator splines are configured to carry the wear debris through the wear debris delivery system and deliver the wear debris to the stator disk.

2. The wear debris delivery system of claim 1, wherein the brake component is fabricated from a ceramic matrix composite (CMC), the CMC structure comprises at least one of a silicon-carbide fiber/silicon-carbide matrix, a carbon fiber/carbon matrix or a carbon fiber/silicon-carbide matrix, an alumina matrix, a mullite matrix or a zirconium diboride matrix.

3. The wear debris delivery system of claim 2, wherein the CMC structure comprises one or more compositions, including: borides, carbides, oxides, phosphides, nitrides or mixed phases, including oxynitrides, or oxycarbides; carbon or silicon-based compositions; refractory metal carbides; or silica and phosphate-based glasses or glass ceramics.

4. The wear debris delivery system of claim 1, wherein the wear debris comprises at least one of a hexagonal boron nitride, graphite, or pitch-based Carbon powder.

5. The wear debris delivery system of claim 1, wherein the torque plate barrel is configured to receive the wear debris via a tube disposed along the torque plate barrel.

6. The wear debris delivery system of claim 5, wherein the tube is fluidly coupled to the stator splines.

7. The wear debris delivery system of claim 1, further comprising two or more injectors.

8. The wear debris delivery system of claim 1, wherein the brake component further comprises a rotor disk.

9. The wear debris delivery system of claim 8, wherein the injector creates a high pressure spray between the rotor disk and the stator disk.

10. The wear debris delivery system of claim 1, wherein the brake component further comprises a tube disposed at an inner diameter of the stator disk, and wherein the wear debris travels through the torque plate barrel to the stator disk via the tube.

11. A method of operating a wear debris delivery system, the method comprising:
   initiating a braking event of a brake component, the brake component comprising:
      a stator disk, the stator disk having at least one wear surface; and
      a torque plate barrel having a series of axially extending stator splines, wherein the stator splines are configured to support the stator disk;
   initiating an injection of a wear debris via an injector configured to inject wear debris into the brake component such that the wear debris travels through the torque plate barrel to the stator disk via the stator splines, wherein the stator splines include at least one hole such that the stator splines are configured to carry the wear debris through the wear debris delivery system and deliver the wear debris to the stator disk; and
   continuously metering the injection into the brake component.

12. The method of claim 11, wherein the brake component is fabricated from a ceramic matrix composite (CMC), the CMC structure comprises at least one of a silicon-carbide fiber/silicon-carbide matrix, a carbon fiber/carbon matrix or a carbon fiber/silicon-carbide matrix, an alumina matrix, a mullite matrix or a zirconium diboride matrix.

13. The method of claim 12, wherein the CMC structure comprises one or more compositions, including: borides, carbides, oxides, phosphides, nitrides or mixed phases, including oxynitrides, or oxycarbides; carbon or silicon-based compositions; refractory metal carbides; or silica and phosphate-based glasses or glass ceramics.

14. The method of claim 11, wherein the wear debris comprises at least one of a hexagonal boron nitride, graphite, or pitch-based Carbon powder.

15. The method of claim 11, wherein the torque plate barrel is configured to receive the wear debris via a tube disposed along the torque plate barrel.

16. The method of claim 15, wherein the tube is fluidly coupled to the stator splines.

17. The method of claim 11, wherein the brake component further comprises a tube disposed at an inner diameter of the stator disk, and wherein the wear debris travels through the torque plate barrel to the stator disk via the tube.

18. The method of claim 11, wherein the brake component further comprises a rotor disk.

19. The method of claim 18, wherein the injector creates a high pressure spray between the rotor disk and the stator disk.

20. The method of claim 11, further comprising initiating an injection of a wear debris via two or more injectors.

* * * * *